Jan. 27, 1931.    T. C. HOLLNAGEL    1,790,377
TRUCK
Filed Sept. 26, 1924    3 Sheets-Sheet 1
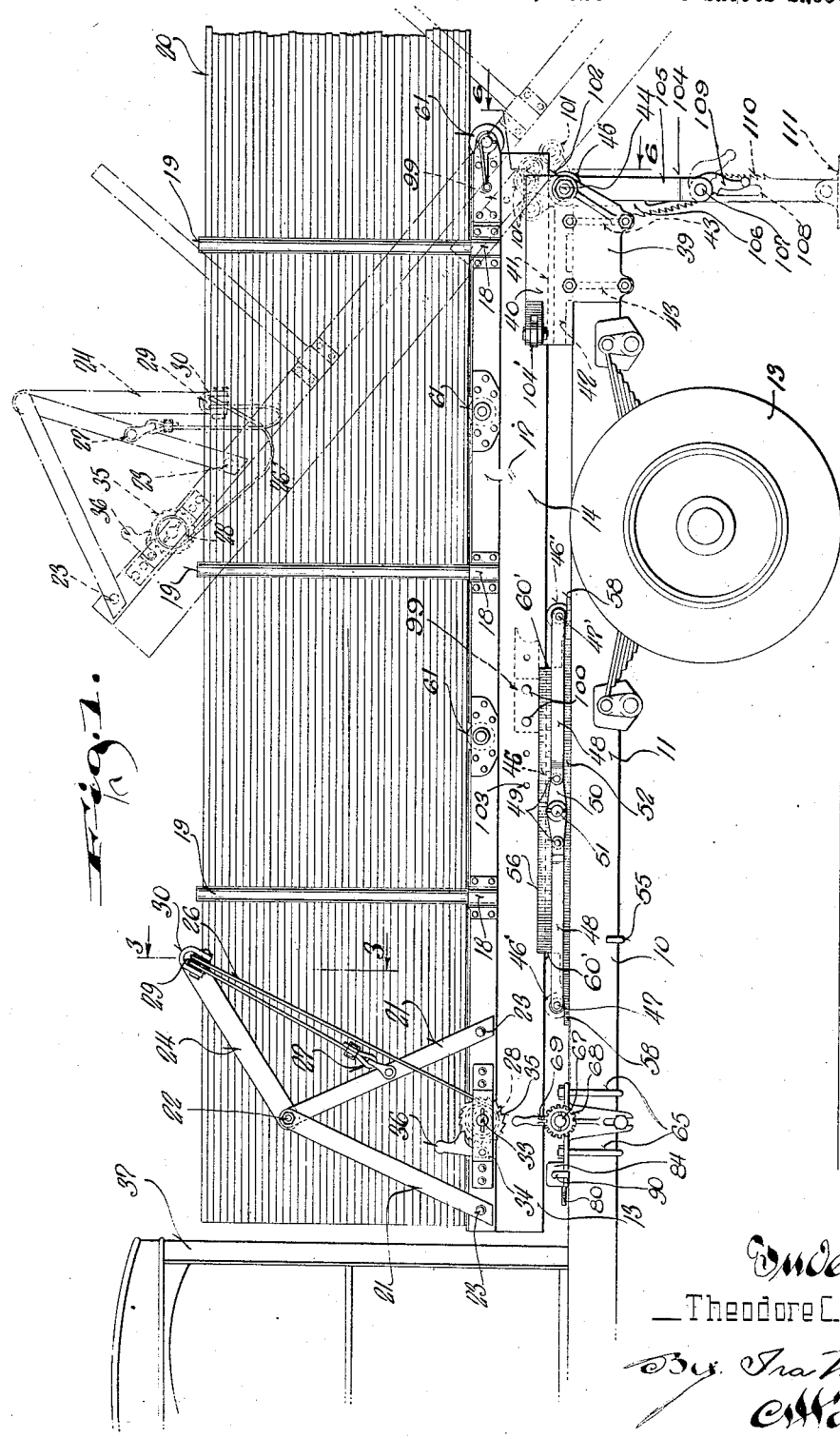
Theodore C. Hollnagel
By Ira M. Jones
Attorney

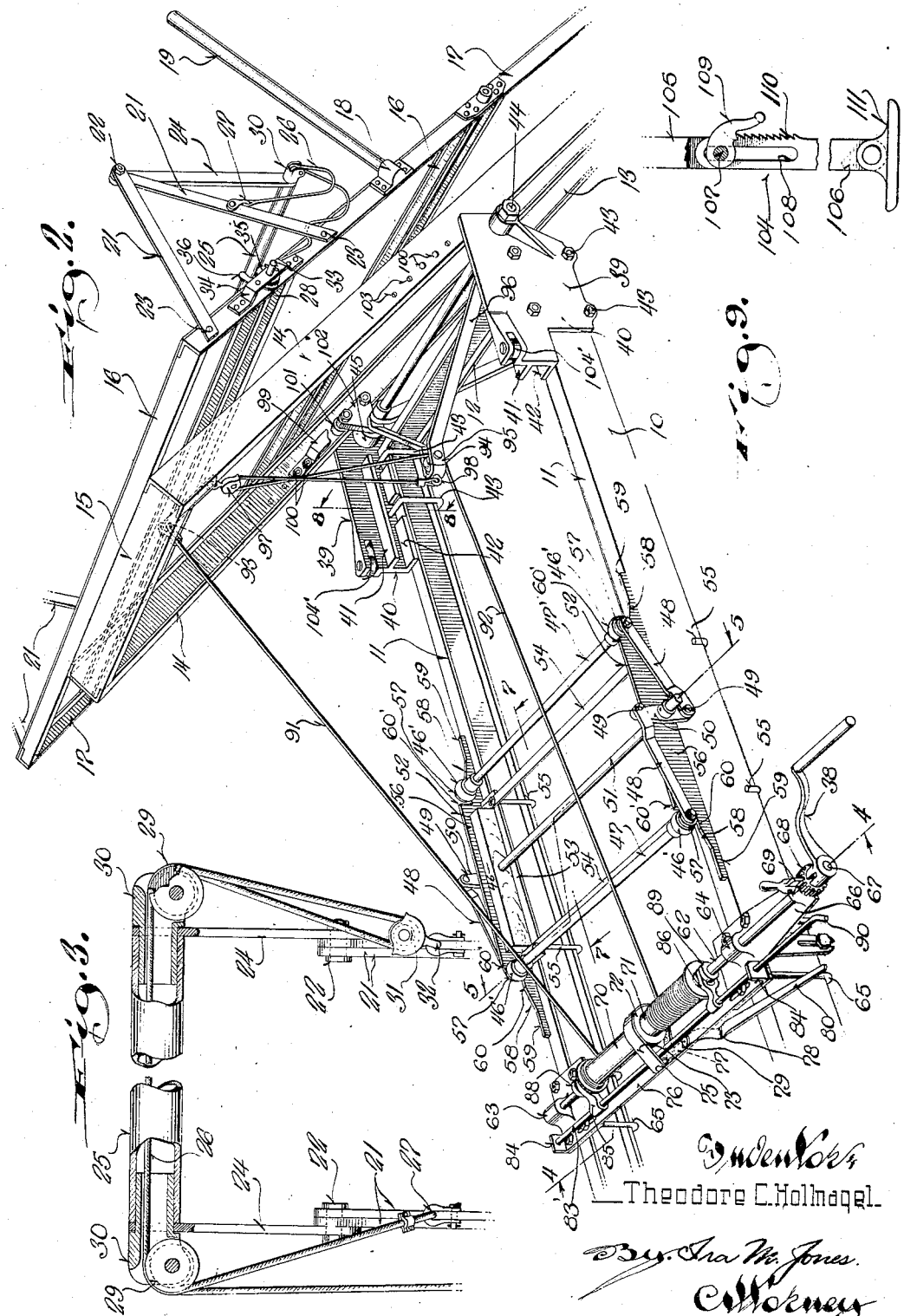

Jan. 27, 1931. T. C. HOLLNAGEL 1,790,377
TRUCK
Filed Sept. 26, 1924 3 Sheets-Sheet 3
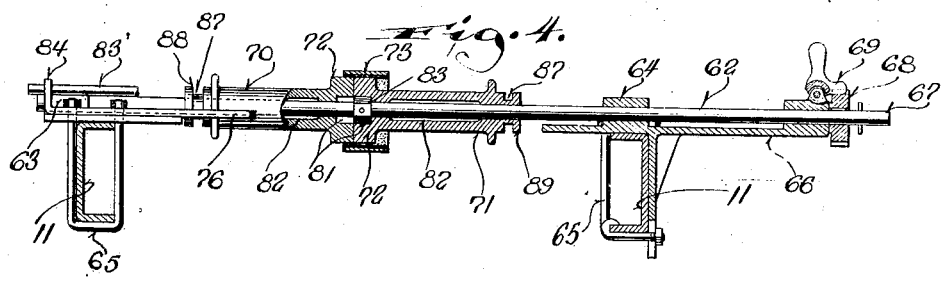
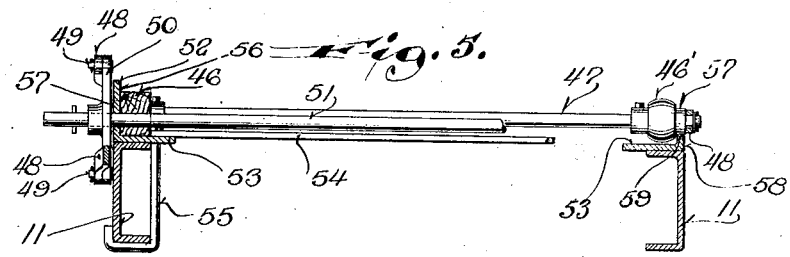
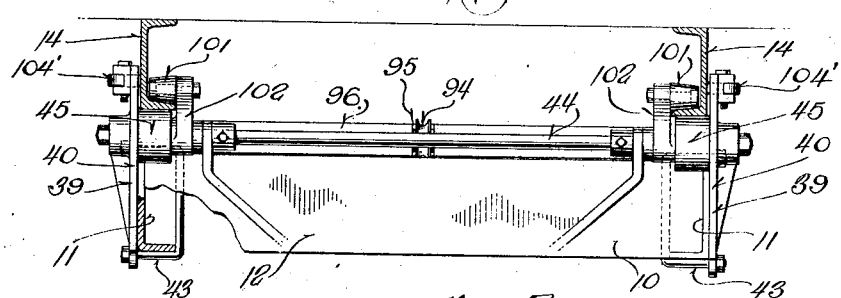
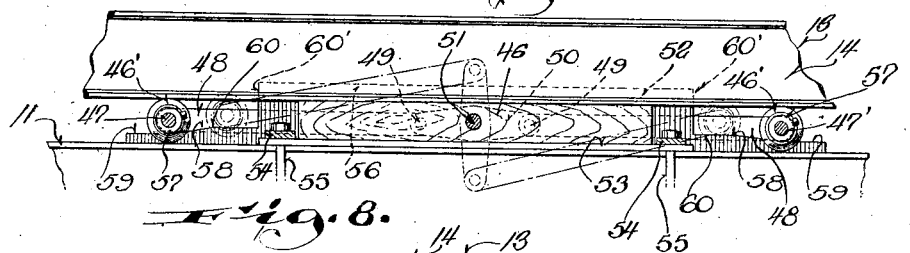
Inventor,
Theodore C. Hollnagel
By Ira M. Jones Patented Jan. 27, 1931

1,790,377

UNITED STATES PATENT OFFICE

THEODORE C. HOLLNAGEL, OF MILWAUKEE, WISCONSIN, ASSIGNOR TO THE HUGHES-KEENAN COMPANY, OF MANSFIELD, OHIO, A CORPORATION OF OHIO

TRUCK

Application filed September 26, 1924. Serial No. 740,034.

This invention relates to certain new and useful improvements in trucks and refers more particularly to a truck for handling lumber, although it is to be understood that it may be used in connection with other types of material.

This invention has as one of its objects the provision of an improved type of truck which will facilitate the loading and unloading of lumber, or other materials, to reduce the time required for such operations.

This invention has as another object the provision of an improved type of truck wherein the material carried thereby is held against shifting while being transported and may be deposited in an even pile on the ground, platform or other place without necessitating the separate handling thereof.

This invention has as another object the provision of a supplemental or load carrying frame which is normally mounted on the main or chassis frame of the truck and there held against movement and adapted to be freely moved along the truck chassis frame to a discharge position.

This invention has as a further object the provision of a supplemental or load carrying frame which is normally mounted on the frame against movement and has means permitting the free sliding of the same to discharged position.

It is a further object of this invention to provide a supplemental or load carrying frame of the character described which is capable of being readily attached to any type of standard truck chassis frame without necessitating the weakening thereof by drilling holes for receiving attaching bolts.

And a still further object of this invention resides in the provision of a supplemental load carrying frame of the character described which will be of strong and durable construction and which may be readily applied to trucks now in use or to trucks at their time of manufacture.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of the rear portion of an automotive truck equipped with my invention and illustrating the supplemental frame in load carrying position;

Figure 2 is a fragmentary perspective view of the rear portion of the truck chassis with the supplemental frame in inclined or discharging position;

Figure 3 is an enlarged fragmentary view taken through the load binder or fastening means on the plane of the line 3—3 of Figure 1, parts thereof being in elevation and parts in section to more clearly illustrate details of construction;

Figure 4 is a view, partly in elevation and partly in transverse section, taken through Figure 2 on the plane of the line 4—4 and illustrating the manner of selectively driving the drums;

Figure 5 is a view, partly in elevation and partly in transverse section, taken through Figure 2 on the plane of the line 5—5, illustrating the means permitting free shifting of the supplemental frame to and from discharging position;

Figure 6 is a view, partly in elevation and partly in transverse section, taken through Figure 1 on the plane of the line 6—6, and illustrating the guide rollers for preventing the movement of the supplemental frame in any but a longitudinal line;

Figure 7 is a view, partly in side elevation and partly in longitudinal section, taken through Figure 2 on the plane of the line 7—7, and illustrating the two positions of the means for permitting the free movement of the supplemental frame to and from discharge position;

Figure 8 is a view, partly in elevation and partly in transverse section, illustrating the means supporting the rear portion of the supplemental frame, said view being taken through Figure 2 on the plane of the line 8—8, and Figure 9 is a fragmentary view, with parts broken away, of the foot member for supporting the rear end of the chassis frame when the supplemental frame is shifted to discharge position.

Referring now more particularly to the accompanying drawings, in which like numerals designate like parts throughout the several views, 10 designates a truck chassis frame including side sills or channel beams 11 connected at their rear ends by a transverse beam 12 and supported by rear traction wheels 13 and forward steering wheels, not shown.

Mounted on the chassis frame, in the manner hereinafter described, is a supplemental frame formed of side and end channel beams 14 and 15, respectively, and carrying a load supporting frame which may be a unitary part of the supplemental frame and which projects beyond the sides thereof and consists of spaced transverse members 16 connected at their outer ends by side sills 17. See Fig. 2. The sills 17 have sockets 18 secured thereto in which stakes 19 are removably engaged to retain in place the lumber or other material 20 being handled.

In the drawings, the load 20 is firmly held against shifting while being transported, or while the supplemental frame is being moved to discharge position, by the binding device illustrated in Figs. 1, 2 and 3. The binding device comprises pairs of straps 21 connected at their outer ends by a pin 22 and having their inner ends spaced and secured to the adjacent sills 17 by bolts or rivets 23 to form supporting standards. A lever or arm 24 is pivotally supported from the pin 22 of each standard, and the ends of the arms 24 are connected by a binding bar 25 which is adapted to be firmly pressed against the top of the load and there held under tension to firmly secure it against shifting.

The binding bar is held in firm engagement with the load by a cable 26, one end of which is secured to one standard 21, as at 27, and the other end of which is adapted to be wound on a drum 28. The cable is passed through the bar 25, which is tubular (Fig. 3), over guide pulleys 29 journaled in end members 30 and is trained about a pulley block 31 connected with the other standard 21, as at 32. The end members 30 are tubular and pass through the outer ends of the links 24 into the bar 25 to thus secure the bar in position. The drum 28 is mounted on a shaft 33 journaled in the adjacent sill 17 and a bracket member 34 carried thereby and is adapted to be readily releasably secured against rotation by a ratchet wheel 35 fixed to the shaft and with which a detent or pawl 36 is engageable.

When the truck is being loaded, the binding device is thrown out of the way against the driver's cab 37 and, after the load is in place, is swung over to engage the bar 25 with the top of the load. A crank or member 38, see Fig. 2, is then engaged over the outer end of shaft 33, which is provided with means to facilitate the driving engagement of the crank member therewith, and rotated to wind the cable onto the drum, causing the bar 25 to be firmly engaged with the load. The bar is then secured in such position with a tension on the cable by engaging the detent or pawl 36 with the ratchet wheel 35.

Mounted on the sills 11 adjacent the rear ends thereof are guide members 39 preferably in the form of relatively heavy plates or castings having vertical portions 40 which fit against sides of the sills and extend thereabove. Longitudinal, horizontal flanges 41 and 42 project inwardly from the members 39 (Figs. 2 and 3), the flanges 42 resting on the tops of sills 11 and the flanges 41 providing a support or rest for the rear portion of the supplemental frame when in normal position. The members 39 are secured to the chassis frame sills by U-bolts, or other securing means 43.

The members 39 preferably extend rearwardly beyond the ends of the sills 11 (see Fig. 8) and are connected by a shaft 44 on which rollers 45 are mounted in line with the flanges 41 but with their top-most surfaces on a slightly lower plane than the upper faces of said flanges. When the supplemental frame is in its load carrying or normal position, the sills 14 rest on the flanges 41 at the rear and on rests or supports 46 mounted on the sills 11 adjacent their forward ends. The rests 41, 46 for the supplemental frame are best shown in Fig. 2.

The upper surfaces of the rests 46 are on an even plane with the flanges 41 and the forward or inner end of the supplemental frame is adapted to be elevated to raise the supplemental frame from the rests 41 and 46 to be supported by the rollers 45 and rollers 46′, to be later described, to facilitate the rearward movement of the frame to discharge position.

The rollers 46′ are divided into pairs, the forward pair being journaled on a common shaft 47 (Figs. 2 and 7) and the rear pair on a common shaft 47′, and held on their shafts in alignment with the sills 14 by collars or sleeve members 57. The shafts 47 and 47′ are connected for coordinated movement toward and away from each other by pairs of link members 48, the inner ends of which are pivotally connected, as at 49, with the opposite ends of levers or rocker arms 50 mounted on the outer ends of a shaft 51 journaled in guide members 52 (Fig. 5) secured to the sills 14, and the outer ends of which are pivotally connected with the outer ends of shafts 47 and 47'. Each member 52 is of preferably right angular shape in tranverse section to provide a flange 53 adapted to rest on the chassis sill 11 to which it is secured by transverse braces 54 and J-bolts 55 and the rests 46 are preferably secured to the members 52 between the rollers 46' (Figs. 2 and 7).

The vertical portions 56 of the guide members 52 extend over the sills 14 of the supplemental frame when the same is in load carrying position and, with the members 39, prevent side lashing of the supplemental frame when the truck is traveling. The ends of the vertical portions 56 are provided with supporting tracks 58 on which the collars or sleeves 57 run, the tracks being each formed with a low horizontal portion 59 at its outer end connected with an inner, higher horizontal portion 60 by an inclined way. The collars 57 normally rest on the track portions 59 with the top-most parts of the rollers 46' on a plane slightly lower than the upper surfaces of the rests 46 and the flanges 41, and rotation of shaft 51, to draw the shafts 47 and 47' together, causes the collars 57 to ride onto the higher portions 60 slightly elevating the forward end of the supplemental frame, raising it off the rests 46 and flanges 41, to be supported by the rollers 45 and 46'. The portions 60 of the tracks at the forward ends of the guide members are preferably on a slightly higher plane than the portions 60 of the rear tracks to accommodate the inclination of the supplemental frame when its forward end is elevated.

The shaft 51 is rotated to elevate the supplemental frame by the crank member 38 (Fig. 2) which is engageable over the end thereof extended beyond the chassis frame and provided with means for non-rotatably securing the crank member thereon. The movement of the shafts 47 and 47' toward each other is limited by the abutments 60' (Figs. 2 and 7) formed at the inner ends of the track portions 60. When it is desired to deposit the load in an even pile, the supplemental frame is shifted rearwardly and the rear end dropped. The binder device is then released and the load deposited on the ground by driving the truck forward at a slow speed, the load readily leaving the supplemental frame by reason of rollers 61 located along the supplemental frame at intervals (Fig. 1).

Control of the movement of the supplemental frame along the chassis frame is accomplished by a windlass mechanism including a shaft 62 (Figs. 2 and 4) extended transversely of the chassis frame, adjacent the cab 37 (Fig. 1), and journaled in bearings 63 and 64 secured to the side sills 11 by U-clamps or bolts 65. The bearing 64 is provided with an extension 66 (Figs. 2 and 4) beyond which the shaft 62 projects, as at 67, to facilitate the securement thereto of the actuating lever or crank 38, a ratchet wheel 68 being fixed to the extended portion of the shaft and with which a dog or detent 69 is engageable to readily lock the shaft against rotation.

Freely, rotatably mounted on the shaft 62 are two drum members 70 and 71, the inner ends of which are provided with braking drums or flanges 72 with which a friction brake 73 is engageable. One end of the brake 73 is secured, as at 75, to a transverse brace 76 connecting the bearings 63 and 64, and secured thereto by the U-bolts 65, and the other end thereof is pivotally connected with the inner, short end 77 of a fulcrum lever 78 (Fig. 2) pivotally mounted on the brace 76, as at 79, and having its outer, long end 80 extended beyond the sill 11 adjacent bearing 64 to permit its free manipulation to control the unwinding of the drums.

As best shown in Fig. 4, the inner adjacent ends of the drum members 70, 71 are formed with registering, irregular shaped recesses or counter-bores 81 which align with the central bores 82 thereof, through which the shaft 62 passes and in which an irregular shaped drive member 83 fixed on the shaft 62 is selectively engageable to drivingly connect the drums therewith. The drum members are simultaneously shiftable to engage the driving member 83 in the recess 81 of either drum member.

The drum members are shifted to drivingly connect with shaft 62 by a rod 83' (Fig. 4) which is slidably mounted in the up-turned ends 84 of the brace 76 and has forked members 85 and 86 (Fig. 2) fixed thereto and engageable in the grooves or channels 87 of collar members 88 and 89 fixed to the outer ends of the drum 70 and 71, respectively. The end of the rod 83' adjacent the bearing 64 is extended beyond the chassis frame and directed laterally, as at 90 (Fig. 2), to facilitate its operation by the operator.

The supplemental frame is moved to and from the position to which it is elevated by rollers 46' by means of two cables 91 and 92. See Fig. 2. The cable 91 has one end connected with the drum 70 and its other end connected, as at 93, with the supplemental frame adjacent its inner end. The cable 92 has one end connected with the drum 71 and passes rearwardly over a guide pulley 94 journaled in the closed end 95 of a yoke frame 96 which is swingingly mounted from the shaft 44, thence forwardly through a pulley 97 secured to the supplemental frame adjacent the point of securement thereto of the cable 91 and then rearwardly with its end secured to the closed end of the yoke frame, as at 98.

Operation

Assuming the body is loaded and in normal position resting on the flanges 41 and supports 46, unloading is accomplished by rotating shaft 51 in a clockwise direction by means of the crank 38 to draw the shafts 47 and 47' toward each other, as a result of which the collars 57 ride up the inclined portions of the tracks 58 onto the higher portions 60 until the collars engage the abutments 60'. This elevates the supplemental frame, disengaging the sills thereof from the flanges 41 and rests 46, so that the sills are now supported by the rollers 45 and 46'. The front rollers 46' being on a slightly higher plane than the rear rollers 46', by reason of the supporting track portion 60 thereof being a trifle higher, insures their bearing their proportionate share of the load.

The crank 38 is then removed from the shaft 51 and engaged with the extended end 67 of the shaft 62 and the detent or pawl 69 disengaged from the wheel 68 after first shifting the rod 83' to drivingly connect the drum 71 with the shaft. The crank is then rotated to wind the cable 92 on its drum and shift or draw the supplemental frame rearwardly. Friction between the sills 14 and the members 39 is minimized by rollers 104' journaled in the upper inner end portions of the guide members and contacting with the outer faces of the sills.

As the supplemental frame approaches the point where it over-balances, the operator applies the brake 73 to ease its tilting and the dropping of the rear end thereof to the ground. The rearward or discharge movement of the supplemental frame is limited by a stop 99 (Fig. 2) secured to the inner face of each sill 14 by detachable bolts 100 and adapted to engage the innermost of a pair of rollers 101 carried by a bracket 102 (Figs. 2 and 6) swingingly mounted on the adjacent end of the shaft 44. The rollers 101 track on the lower flanges of the side beams 14 (see Fig. 6) and with the rollers 45 guide the longitudinal movement of the supplemental frame while in inclined position. As illustrated in Fig. 2, the sills 14 of the supplemental frame are provided with a plurality of perforations 103 to permit adjustment of the stops 99.

After the supplemental frame has reached its position depicted by dotted lines in Fig. 1, ratchet 36 is disengaged from the ratchet wheel 35 to release the load binder mechanism and the truck is then driven ahead at a slow speed, the load sliding off the supplemental frame and being deposited on the ground in an even pile.

After the load has been discharged, as previously described, the rod 83' is shifted to drivingly connect the drum 70 with shaft 62 and disengage the drum 71 from the shaft. The crank 38 is then rotated to wind the cable 91 on its drum, pulling the inner end of the supplemental frame downwardly and onto the chassis frame until it reaches its full inward position, when the detent 69 is engaged with its wheel 68. The shaft 51 is then rotated in a counter-clockwise direction to move the shafts 47 and 47' away from each other and engage the sleeves 57 on the lower track portions 59, the side sills 14 being then supported by the flanges 41 and rollers 45 and rests 46.

When it is desired to load material onto the truck from an auxiliary trailer or platform, the material 20 is pulled thereon and the truck and platform or auxiliary truck arranged end to end. The material is then bodily shifted onto the auxiliary frame over the rollers 61.

If desired, one or more adjustable jack or supporting legs 104 may be provided to relieve the chassis frame rear end of a portion of the stresses incidental to the movement of the supplemental frame to discharge position. In the present embodiment (Figs. 1 and 9), the leg 104 is constructed of two sections 105 and 106, the section 105 being supported from the shaft 44 and being of two parts into which the section 106 is adjustable. A pin 107 connects the outer ends of the parts of section 105 and passes through an elongated opening or slot 108 in the other section which is held in adjusted position by a dog 109 carried by pin 107 and engageable with teeth 110 on the section 106. The outer or lower end of the section 106 has a foot member 111 secured thereto for engagement with the ground and when not in use the supporting leg is secured in folded position as illustrated in Fig. 1. The jacks or legs 104 prevent the truck from tipping at the forward end when a heavy load is being discharged or taken on.

From the foregoing description taken in connection with the accompanying drawings it will be readily evident to those skilled in the art to which an invention of this character appertains, that I provide an efficient and practical attachment for trucks for the loading and unloading of material which may be built in a truck chassis or applied thereto without in any manner weakening the chassis frame and which will make possible the handling of heavy loads with a minimum of labor and trouble.

Obviously, the present invention is not restricted to the particular embodiment thereof herein shown and described. Moreover, it is not indispensable that all the features of the invention be used conjointly, since they may be employed advantageously in various combinations and sub-combinations.

What I claim as my invention is:

1. In a device of the character described having a chassis frame including side members, a supplemental frame adapted to be normally positioned on the chassis frame and movable thereover to a discharging position, means normally supporting the discharge end of the supplemental frame on the chassis frame, roller means outwardly of said supporting means, and means operable to elevate the inner end of the supplemental frame to raise the same from said supporting means whereby the same is supported at its rear by said roller means.

2. In a device of the character described having a chassis frame including side members, a supplemental frame adapted to be normally positioned on the chassis frame and movable thereover, means normally supporting the supplemental frame on the chassis frame against movement, roller means positioned adjacent the outer end of the supplemental frame, roller means positioned adjacent the inner end of the supplemental frame, and means for elevating the second-mentioned roller means to raise the inner end of the supplemental frame and disengage the supplemental frame from the supporting means whereby the same is supported by both of the roller means and capable of being readily moved over the chassis frame.

3. In a device of the character described having a chassis frame including side members, a supplemental frame adapted to be normally positioned on the chassis frame and movable thereover, means normally supporting the supplemental frame on the chassis frame against movement, roller means positioned adjacent the outer end of the supplemental frame, roller means positioned adjacent the inner end of the supplemental frame, means for elevating the second-mentioned roller means to raise the inner end of the supplemental frame and disengage the supplemental frame from the supporting means whereby the same is supported by both of the roller means and capable of being readily moved over the chassis frame, and means for limiting the movement of the supplemental frame on the roller means.

4. In a device of the character described having a chassis frame including side members, a supplemental frame adapted to be normally positioned on the chassis frame and movable thereover, means normally supporting the supplemental frame on the chassis frame against movement, roller means positioned adjacent the outer end of the supplemental frame, roller means positioned adjacent the inner end of the supplemental frame, means for elevating the second-mentioned roller means to raise the inner end of the supplemental frame and disengage the supplemental frame from the supporting means whereby the same is supported by both of the roller means and capable of being readily moved over the chassis frame, and means for controlling the movement of the supplemental frame on the roller means.

5. In a device of the character described having a chassis frame including side members, a supplemental frame adapted to be normally positioned on the chassis frame and movable thereover to a discharging position, stationary means normally supporting the supplemental frame on the chassis frame, roller means carried by the chassis frame adjacent the outer end of the supplemental frame, roller means carried by the chassis frame adjacent the inner end of the supplemental frame, means operable to raise the second-mentioned roller means to elevate the inner end of the supplemental frame to disengage the supplemental frame from said supporting means and support the same on both of said roller means to facilitate its free movement over the chassis frame to discharge position, and adjustable means for limiting the movement of the supplemental frame over the chassis frame toward discharge position.

6. In a device of the character described having a chassis frame including side members, a supplemental frame adapted to be normally positioned on the chassis frame and movable thereover to a discharging position, stationary means normally supporting the supplemental frame on the chassis frame, roller means carried by the chassis frame adjacent the outer end of the supplemental frame, roller means carried by the chassis frame adjacent the inner end of the supplemental frame, means operable to raise the second-mentioned roller means to elevate the inner end of the supplemental frame to disengage the supplemental frame from said supporting means and support the same on both of said roller means to facilitate its free movement over the chassis frame to discharge position, and means for sliding the supplemental frame rearwardly over the chassis frame after the forward end thereof has been elevated, the supplemental frame tilting on the first-mentioned roller means as the rear end thereof overbalances.

7. In a device of the character described having a chassis frame including side members, a supplemental frame adapted to be normally positioned on the chassis frame and movable thereover to a discharging position, a stationary support normally supporting the discharge end of the supplemental frame, roller means outwardly of said support with the top-most surfaces thereof in approximate alignment with the top-most surfaces of said support, means for sliding the supplemental frame rearwardly over the chassis frame after the forward end thereof has been elevated, the supplemental frame tilting on the roller means as the rear end thereof overbalances, and means for braking the tilting of the supplemental frame as it over-balances.

8. In a device of the character described having a chassis frame including side members, a supplemental frame adapted to be normally positioned on the chassis frame and movable thereover to a discharging position, a stationary support normally supporting the discharge end of the supplemental frame, roller means outwardly of said support with the top-most surfaces thereof in approximate alignment with the top-most surfaces of said support, means for sliding the supplemental frame rearwardly over the chassis frame after the forward end thereof has been elevated, the supplemental frame tilting on the roller means as the rear end thereof over-balances, means for braking the tilting of the supplemental frame as it over-balances, and means for returning the supplemental frame to its normal position on the chassis frame.

9. In a device of the character described having a chassis frame including side members, a supplemental frame adapted to be normally positioned on the chassis frame and movable thereover to a discharging position, a stationary support normally supporting the discharge end of the supplemental frame, roller means outwardly of said support with the top-most surfaces thereof in approximate alignment with the top-most surfaces of said support, means for sliding the supplemental frame rearwardly over the chassis frame after the forward end thereof has been elevated, the supplemental frame tilting on the roller means as the rear end thereof over-balances, and means limiting the rearward movement of the supplemental frame.

10. In a truck having a chassis frame including side sills, a guide member secured to each side sill adjacent the outer end thereof and extending above the top surface thereof, a supplemental load carrying frame including side sills adapted to be normally mounted on the chassis frame with its sills in approximate parallel alignment with the sills of the chassis frame, supporting members carried by the guide members and on which the rear portions of the supplemental frame sills normally rest, roller means carried by the guide members rearwardly of the supporting members, and means for elevating the inner end of the supplemental frame whereby the same is supported by said roller means free of the supporting members to facilitate its rearward shifting movement.

11. In a truck having a chassis frame including side sills, a guide member secured to each side sill adjacent the outer end thereof and extending above the top surface thereof, a supplemental load carrying frame including side sills adapted to be normally mounted on the chassis frame with its sills in approximately parallel alignment with the sills of the chassis frame, upwardly extended portions on the guide members for restraining the supplemental frame from side movement, supporting members carried by the guide members and on which the rear portions of the supplemental frame sills normally rest, roller means carried by the guide members rearwardly of the supporting members, means for elevating the inner end of the supplemental frame whereby the said supplemental frame is supported by said roller means free of the supporting members to facilitate its rearward shifting movement, and side guide rollers carried by the upwardly extended portions of the guide members for tracking on the supplemental frame sills to prevent rubbing of the sills against the guide members as the supplemental frame is shifted to and from discharge position.

12. In a truck having a chassis frame including side sills, a guide member secured to each side sill adjacent the outer end thereof and extending above the top surface thereof, a supplemental load carrying frame including side sills adapted to be normally mounted on the chassis frame with its sills in approximate parallel alignment with the sills of the chassis frame and held from side movement at the rear by the upwardly extended portions of the guide members, a shaft connecting the upwardly extended portions of the guide members, roller members journaled on said shaft in approximate alignment with the sills of the supplemental frame and on which the supplemental frame sills ride, a supplemental frame support carried by each guide member with its upper surface slightly above the top-most portion of the adjacent roller member and on which the corresponding supplemental frame sill normally rests whereby sliding movement of the supplemental frame is frictionally resisted, and means for elevating the inner end of the supplemental frame to raise the sills thereof from said supports and engage the same with the roller members whereby the same may be freely shifted rearwardly.

13. In a truck having a chassis frame including side sill members, a supplemental frame including side sills adapted to be normally positioned on the chassis frame with its sills parallel with the chassis frame sills, means on which the forward portion of the supplemental frame rests when in normal position, a shaft extended across the chassis frame adjacent said means, rollers mounted on said shaft in register with the sills of the supplemental frame, means on which the rear portion of the supplemental frame rests when in normal position, roller members mounted rearwardly of the last-mentional means, whereby the rear portion of the supplemental frame is supported thereby when the forward end thereof is elevated, and means operable to raise said shaft and cause the rollers mounted thereon to elevate the forward end of the supplemental frame, whereby the supplemental frame is supported by the forward and rear rollers to facilitate the free rearward shifting of the supplemental frame to a discharge position.

14. In a device of the character described having a chassis frame, a supplemental load carrying frame adapted to be normally positioned on the chassis frame and including side sills, rest members carried by the chassis frame adjacent its outer and inner ends and on which the supplemental frame sills normally rest, roller means carried by the chassis frame outwardly of the rear rests, roller means mounted adjacent the inner rests, and means actuating said second-mentioned roller means to elevate the inner end of the supplemental frame and disengage the same from said rests to be supported entirely by the roller means whereby the frame may be readily shifted rearwardly to discharge position.

15. A device of the class described, comprising a chassis including side rails, a supplementary frame movable thereover, means for normally supporting the supplemental frame in a normal position over the side rails, fixed rollers at the discharge end of the chassis for facilitating free movement of said supplemental frame and adapted to be disengaged from the supplemental frame when the same is in normal position and to be engaged by the supplemental frame when said frame is tilted out of its normal position and means for tilting the supplemental frame out of its normal position to engage the same with the rollers.

16. In a device of the character described having a chassis frame including side members, a supplemental frame adapted to be normally positioned on the chassis frame and movable thereover, means normally supporting the supplemental frame on the chassis frame, roller means positioned adjacent the outer end of the supplemental frame, roller means positioned adjacent the inner end of the supplemental frame, and means for moving the second mentioned roller means to elevate the inner end of the supplemental frame so that the same will be supported by said roller means to facilitate its free movement over the chassis frame to a discharging position.

17. A device of the character described, comprising a chassis frame, a load receiving member adapted to be normally positioned and supported on the chassis frame and movable thereover to a discharging position, means normally supporting the discharge end of the load receiving member from the chassis frame, roller means outwardly of said supporting means, operator-controlled means operable to elevate the inner end of said load receiving member to raise the same from said supporting means whereby it is supported at its rear by the roller means, and rollers on the load receiving member to facilitate loading and discharge.

18. In a dumping truck having a chassis and a load carrying member mounted thereon, means for elevating the forward end of the load-carrying frame preparatory to dumping comprising, in combination, a pair of track members extending longitudinally of the chassis on each side thereof and each presenting oppositely inclined surfaces so arranged that the highest parts of the track members are toward the middle; a pair of rocker arms pivoted centrally below the highest parts of the track members to rock in vertical planes alongside said track members; a pair of link members pivotally connected at one end to the opposite ends of each rocker arm; a roller on the end of each of said pivoted levers and each movable over one of the track members; and operator-controlled means for rocking the rocker arms and hence effecting elevation an approach of two rollers on each side of the chassis, thereby to elevate the load-carrying frame.

19. In a dumping truck having a chassis and a load carrying member mounted thereon, means for elevating the forward end of the load-carrying frame preparatory to dumping comprising, in combination, a pair of track members extending longitudinally of the chassis on each side thereof; the tracks each being formed with a relatively low horizontal portion at the opposite ends connected with an inner and higher horizontal portion by an inclined way; a pair of rocker arms pivoted centrally below the highest parts of the track members to rock in vertical planes alongside said track members; a pair of link members pivotally connected at one end to the opposite ends of each rocker arm; a roller on the end of each of said pivoted levers and each movable over one of the track members; and operator-controlled means for rocking the rocker arms and hence effecting elevation and approach of two rollers on each side of the chassis, thereby to elevate the load-carrying frame.

20. In a dumping truck having a chassis and a load carrying member mounted thereon, means for elevating the forward end of the load-carrying frame comprising, in combination, a pair of track members extending longitudinally of the chassis on each side thereof; the tracks each being formed with a relatively low horizontal portion at the opposite ends connected with an inner and higher horizontal portion by an inclined way; the higher track portion which is rearward or nearer the dumping end being slightly lower than the higher portion which is forward; a pair of rocker arms pivoted centrally below the highest parts of the track members to rock in vertical planes alongside said track members; a pair of link members pivotally connected at one end to the opposite ends of each rocker arm; a roller on the end of each of said pivoted levers and each movable over one of the track members; and operator-controlled means for rocking the rocker arms and hence effecting elevation and approach of two rollers on each side of the chassis, thereby to elevate the load-carrying frame; the slight difference in elevation of the forward and rearward higher track portions effecting a slight inclination of the load-carrying frame when elevated by the rollers.

21. In combination, a chassis frame, a supplemental frame movable over the chassis frame to a discharging position, means on the chassis frame for supporting the supplemental frame in normal position, a plurality of elements positioned between the two frames and adapted to support the supplemental frame prior to its assuming a discharging position, one of said elements being positioned rearwardly and slightly below the top of the normal supporting means and the others of said elements being adapted slightly to elevate the supplemental frame at one end, so that the supplemental frame will be supported thereby and by the first mentioned element prior to its movement to a discharging position.

In testimony whereof I affix my signature.

THEODORE C. HOLLNAGEL.